United States Patent
Świrniak et al.

(10) Patent No.: US 11,506,293 B2
(45) Date of Patent: Nov. 22, 2022

(54) VALVE ASSEMBLY

(71) Applicant: Goodrich Corporation, Charlotte, NC (US)

(72) Inventors: Paweł Świrniak, Wrocław (PL); Krzysztof Słomiany, Wrocław (PL)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/232,688

(22) Filed: Apr. 16, 2021

(65) Prior Publication Data

US 2022/0018452 A1 Jan. 20, 2022

(30) Foreign Application Priority Data

Jul. 17, 2020 (EP) ..................................... 20461544

(51) Int. Cl.
*F16K 5/20* (2006.01)
*F16K 5/06* (2006.01)
*F16K 11/087* (2006.01)

(52) U.S. Cl.
CPC ............ *F16K 5/205* (2013.01); *F16K 5/0605* (2013.01); *F16K 5/0678* (2013.01);
(Continued)

(58) Field of Classification Search
CPC .... F16K 5/0689; F16K 5/0673; F16K 5/0678; F16K 5/201; F16K 5/205; F16K 5/207;
(Continued)

(56) References Cited

U.S. PATENT DOCUMENTS 2,799,470 A * 7/1957 Margrave .............. F16K 5/0464
251/172
3,118,650 A * 1/1964 Cooper ............... F16K 11/0873
251/315.13
(Continued)

FOREIGN PATENT DOCUMENTS

DE 1809542 A1 * 7/1968
DE 1809542 A1 1/1970
(Continued)

OTHER PUBLICATIONS

European Search Report for Application No. 20461544.7, dated Dec. 1, 2020, 6 pages.

*Primary Examiner* — David Colon-Morales
(74) *Attorney, Agent, or Firm* — Cantor Colburn LLP (57) ABSTRACT

The disclosure relates to valve assemblies having a valve body including a first port, a second port and a fluid passageway extending therebetween. A valve member, having a through port, is arranged in the fluid passageway and is moveable between an open and closed positions. A sealing arrangement is arranged between the first port and the valve member and includes a sealing member arranged to seal against the valve member such that fluid cannot flow around an outer surface of the valve member. The sealing arrangement includes a sleeve arranged in the fluid passageway between the first port and the valve member. A deformable, incompressible, medium is contained around the sleeve and arranged such that, in use, a fluid within the sleeve exerts an outward pressure on the sleeve causing the sleeve to deform and act on the medium to push the sealing member against the valve member.

18 Claims, 7 Drawing Sheets

(52) U.S. Cl.
CPC ............ *F16K 5/0689* (2013.01); *F16K 5/201* (2013.01); *F16K 11/0873* (2013.01)

(58) Field of Classification Search
CPC .......... F16K 5/208; F16K 5/168; F16K 5/188; F16K 11/0873
See application file for complete search history.

(56) References Cited

U.S. PATENT DOCUMENTS

| | | | | |
|---|---|---|---|---|
| 3,266,769 | A | * | 8/1966 | Shand ..................... F16K 5/207 251/315.08 |
| 3,749,357 | A | * | 7/1973 | Fowler .................... F16K 5/205 251/315.08 |
| 3,901,474 | A | * | 8/1975 | Kubota .................. F16K 5/205 251/188 |
| 4,332,267 | A | | 6/1982 | Evans |
| 4,511,150 | A | * | 4/1985 | Seguenot ................ F16K 5/205 251/171 |
| 4,911,408 | A | * | 3/1990 | Kemp .................... F16K 5/0673 251/315.08 |
| 6,698,712 | B2 | | 3/2004 | Milberger et al. |
| 7,690,626 | B2 | | 4/2010 | Stunkard |
| 2004/0036052 | A1 | * | 2/2004 | Nowak ............... F16K 11/0873 251/314 |
| 2022/0042609 | A1 | * | 2/2022 | Boyd ..................... F16K 5/205 |

FOREIGN PATENT DOCUMENTS

| | | | | |
|---|---|---|---|---|
| DE | 3209402 A1 | * | 3/1982 | |
| DE | 3209402 A1 | | 9/1983 | |
| EP | 2213850 A1 | * | 8/2010 | ................ F01L 7/02 |
| EP | 2213850 A1 | | 8/2010 | |
| FR | 2193459 A6 | * | 7/1972 | |
| FR | 2202572 A5 | * | 10/1972 | |
| FR | 2940828 A1 | * | 7/2010 | ............. F16K 5/14 |
| WO | WO-2006091117 A1 | * | 8/2006 | ............ F16K 5/201 |

\* cited by examiner

VALVE ASSEMBLY

FOREIGN PRIORITY

This application claims priority to European Patent Application No. 20461544.7 filed Jul. 17, 2020, the entire contents of which is incorporated herein by reference.

TECHNICAL FIELD

This disclosure relates to a valve assembly and in particular to a valve assembly comprising a sealing arrangement.

BACKGROUND ART

Valve assemblies are used in a variety of different applications where control of fluid flow is required. One common type of valve assembly is a ball valve assembly, i.e. a ball valve. Ball valves typically comprise a valve body having an input port and an outlet port, a fluid passageway extending between these ports and a ball, having a through port therein, which is arranged in the fluid passageway. Rotation of the ball controls alignment of the through port with the fluid passageway and therefore the position of the ball can be used to control the flow of fluid through the valve.

In ball valves, seals are typically provided between the rotatable ball and the fluid passageway so as to prevent fluid passing around the outside of the ball, both when the valve is open, and when the valve is closed. Ball valves may comprise a plurality of input and/or output ports and so sealing of the ball is particularly important in preventing fluid from escaping around the ball and leaking into inlets or outlets in an undesired manner. Additionally, fluid which is able to escape around the ball may leak out of the valve completely, e.g. through any openings through which suitable means are provided for controlling the position of the ball. Of course the leaking of fluid out of the valve completely, or out through undesired ports may be undesirable, particularly as the valves may be used to control the flow of potentially dangerous fluids.

Sealing in prior art ball valves typically involves a spring which biases a seal into contact with the ball. However, when the fluid pressure in the ball valve is high, the fluid pressure can be sufficiently high to force the seal at least partially away from the ball, i.e. overcoming the biasing force, and thus leak around the ball.

It would be advantageous to provide a sealing arrangement for a valve which addresses the problems outlined above.

SUMMARY OF THE DISCLOSURE

In accordance with a first aspect, the present disclosure provides a valve assembly comprising of a valve body comprising a first port, a second port and a fluid passageway extending between the first and second ports; a valve member, comprising a through port, arranged in the fluid passageway and moveable between an open position in which fluid can flow between the first and second ports through the through port, and a closed position in which fluid cannot flow between the first and second ports; and a sealing arrangement, arranged between the first port and the valve member, comprising: a sealing member arranged to seal against the valve member such that fluid cannot flow around an outer surface of the valve member; a sleeve arranged in the fluid passageway between the first port and the valve member; and a deformable, incompressible, medium contained around the sleeve and arranged such that, in use, a fluid within the sleeve exerts an outward pressure on the sleeve causing the sleeve to deform and act on the medium which applies a force to push the sealing member against the valve member.

Thus it will be appreciated that aspects of the present disclosure provide an improved valve assembly having a sealing arrangement which utilises the fluid pressure passing through the valve assembly to actively increase the quality of the seal. Specifically, the sealing arrangement redirects the fluid pressure exerted on the sleeve and applies that pressure to the sealing member which seals against the valve member. This is made possible by the medium which acts to redirect the force from the sleeve. As the sleeve deforms/expands towards the medium as it experiences a fluid pressure in use, due to the incompressibility of the medium, the outward force of the deforming/expanding sleeve will cause the medium to deform and press against the sealing member to improve the seal. As the fluid pressure increases, the force being applied to the sealing member will also increase accordingly. The improved valve assembly ensures that a high quality seal is provided even at high pressures and thus leaking of fluid around the valve member may thus be prevented.

The valve member is movable between open and closed positions so as to be able to control the flow of fluid through the valve assembly. As the valve member is moved between these positions, it has to overcome the frictional force applied by the sealing member which is pressed against the valve member. The valve assembly according to the present disclosure helps to ensure a high quality seal is provided when the fluid pressure is high, without increasing friction between the valve member and the sealing member when the operational pressure is low. This therefore allows the valve member to be moved more easily when the fluid pressure is low, ensuring that the valve assembly is easy to operate.

When designing a typical valve assembly, it may be necessary to incorporate tolerances into the design so as to ensure that the valve assembly functions as intended, even if certain components are manufactured having slightly different dimensions than those intended. The valve assembly according to the present disclosure may advantageously reduce the need to incorporate tolerances into parts of the valve assembly. For example, as the sealing member may be moved relative to the valve member, it may no longer be necessary to incorporate a gap between the valve member and the sealing member, as the movement of the sealing member may accommodate any differences in size of the valve member or valve body.

The direction of fluid flow through the valve assembly may define whether the first and second ports are acting as inlet ports and outlet ports. For example, the first port may be an inlet port and the second port may be an outlet port, or the second port may be an inlet port and the first port may be an outlet port. When the valve member is in the open position, the through port may be fully aligned with the fluid passageway such that fluid can flow therethrough. However, the through port may only be partially aligned with the fluid passageway, and fluid may nonetheless be able to flow through the valve assembly. When in the closed position, the through port may be arranged such that there is no fluid connection between the first and second ports.

The sealing arrangement of the valve assembly may be suitable for sealing a valve member of various different types, for example a rotatable valve. In some examples, the valve member comprises a rotatable ball valve member. The ball valve member may thus have a spherical outer surface which the sealing member seals against. The sealing arrangement of the valve assembly may be particularly suitable for use with ball valves. In the case where multiple sealing arrangements are provided, as will be discussed in more detail below, when there is increased pressure at one port, e.g. the first port, and an ambient pressure at another port, e.g. the second port, the overall frictional force on the ball valve member may be reduced as there will be minimal, or no, additional frictional force provided by the sealing arrangement on the port which is experiencing ambient pressure. This may mean that the valve member can be moved more easily between its open and closed positions.

Depending on the use of the valve assembly, and the fluid pressures within the valve assembly in use, the sealing arrangement as described above may be sufficient for sealing the valve member when the fluid pressure within the valve member is low, as well as high. However, in some embodiments, the valve assembly further comprises a resilient member arranged to resiliently bias the sealing member into contact with the valve member. A resilient member arranged in this manner may advantageously apply a force to the sealing member holding it against the valve member, even when the fluid pressure within the valve assembly is relatively low. In other words, the resilient member may hold the sealing member against the valve member when there is little, or no force provided by the medium due to the sleeve not being deformed by the fluid pressure within the valve assembly. It may, for example, be the case that the sleeve only begins to deform once a threshold fluid pressure is reached and thus the resilient member provides a biasing force suitable for sealing before this threshold is reached. Accordingly, the resilient member may help to ensure that the sealing arrangement provides a sufficiently high quality seal, irrespective of the fluid pressure within the valve assembly. The resilient member may be a spring, e.g. a coiled spring which surrounds the sleeve.

Certain types of valve assembly, for example those which use a rotatable ball valve member, are often very small and so in some cases it may not be possible to provide a sufficient sealing force from a resilient member alone, for example due to space constraints limiting the size of the resilient member. Accordingly, the combination of the resilient member to provide the initial sealing force in lower pressure situations, and the medium which acts on the sealing member in higher pressure situations, provides an improved valve assembly which does not necessarily require re-configuration of the resilient member.

The sleeve and sealing member may be arranged in any suitable manner within the fluid passageway such that fluid within the fluid passageway cannot escape around the valve member. In some examples, the sealing member extends around a portion of the sleeve, and wherein said portion of the sleeve adjacent the sealing member is configured such that it does not deform under fluid pressure in the sleeve. This configuration helps to ensure that the force applied by the fluid pressure acting on the sleeve acts predominantly in a direction to improve the quality of the seal provided by the sealing member, instead of acting to deform the sealing member and reduce the sealing quality.

Stiffening of the sleeve in the portion adjacent the sealing member may be achieved in any suitable manner. For example, the portion of the sleeve adjacent the sealing member may be thicker, or made from a different material such that it cannot deform. In some examples, a stiffening band is arranged around the portion of the sleeve adjacent the sealing member such that said portion cannot deform.

The stiffening band may be a separate part which is attached around the sleeve. Alternatively, the stiffening band may be integrally provided with the sleeve. For example, the lower portion of the sleeve may be folded over such that it is thicker and thus more resistant to deformation.

In some examples, a first sealing element is arranged between the sealing member and the sleeve. The first sealing element therefore seals the sealing member around the sleeve so as to prevent the medium from escaping into the fluid passageway and also prevent fluid from within the passageway escaping between the sealing member and the sleeve. In some examples, a second sealing element is arranged between the sealing member and the valve body. The second sealing element thus prevents the medium from escaping around the sealing member between the sealing member and the valve body. The first and second sealing elements may, for example, be in the form of O-rings.

The medium may be used to apply an initial pressure to the sealing member so as to ensure that the sealing member seals around the valve member even under low operational pressures. Accordingly, in some examples, the medium is inserted into the valve assembly under pressure. The introduction under pressure may thus mean that the medium forces the sealing member into contact with the valve member under low operational pressures of fluid within the valve assembly. It may, therefore, be possible to achieve sealing at low pressures without the use of a resilient member as described above. However, the medium inserted under pressure may also be used in combination with the resilient member described above. The pressure at which the medium is inserted may be dependent on a number of different factors including: the application of the valve assembly, the operational pressures in use, the material from which the sealing member is made, the size of the valve assembly etc.

As will be understood, the sleeve may be configured such that it can be deformed under fluid pressure in the valve assembly, so as to transfer the force applied by the fluid pressure on to the medium and therefore onto the sealing member. As mentioned above, the sleeve may only deform/expand once the fluid pressure within the valve assembly reaches a threshold. The deformation of the sleeve may also only be relatively small. The ability for the sleeve to deform may be made possible through any suitable means. The sleeve may have a relatively thin outer wall. For example, the sleeve may be made from a relatively thin sheet material such that it deforms under typical fluid pressures. For example, the sleeve may be made from metal such as steel, copper alloys or aluminium. Alternatively the sleeve may be made from plastic composites including glass, carbon, aramid fiber etc.

In some examples, the sleeve comprises a corrugated structure. The corrugated structure of the sleeve may allow the sleeve to deform, i.e. expand, into the medium more easily and also return to an undeformed state more easily. The corrugated structure may also reduce the stresses and strains experienced by the sleeve as it deforms, and thus improve the longevity of the sleeve, and hence the valve assembly.

The medium may be contained around the sleeve in any suitable manner such that as the sleeve deforms, the medium deforms and is forced against the sealing member. In some examples, the medium is contained within a cavity, defined by the valve body, around the sleeve. In examples which comprise a resilient member, the resilient member may also be arranged in the cavity. In some examples, the sealing member defines a first end of the cavity, and second end of the cavity is defined by a fixed wall. The fixed wall may help to ensure that the force generated by the deformation of the medium is focused towards acting on the sealing member.

The deformable medium may be any medium which is incompressible such that it efficiently transfers the force from the sleeve to the sealing member. The incompressible nature of the medium ensures that substantially all of the force transferred to the medium by the sleeve is also transferred to the sealing member. In some examples, the medium comprises grease or oil. The use of grease or oil may be advantageous as such materials can easily be inserted into the valve assembly. Additionally, such materials can easily fill the space, e.g. the cavity surrounding the sleeve, into which they are inserted. Further, such materials can easily accommodate other components around the sleeve, such as the resilient member where provided.

Depending on the particular configuration of the valve assembly, its use, and the direction of fluid flow within the valve assembly, it may only be necessary to have a sealing arrangement arranged between one port and the valve member. For example, when the first port acts as the input port, when the valve is closed it may only be the side of the valve assembly of the first port which experiences an increased fluid pressure. When open, the fluid pressure may drop significantly and it may therefore not be necessary to provide a sealing arrangement between the second port and the valve member. However, in some examples, the valve assembly comprises a further sealing arrangement arranged between the second port and the valve member comprising: a further sealing member arranged to seal against the valve member such that fluid cannot flow around an outer surface of the valve member; a further sleeve arranged in the fluid passageway between the second port and the valve member; and a further deformable, incompressible, medium contained around the further sleeve and arranged such that, in use, a fluid within the further sleeve exerts an outward pressure on the further sleeve causing the further sleeve to deform and act on the further medium which applies a force to push the further sealing member against the valve member.

The further sealing arrangement may be identical to the sealing arrangement described in detail above and may include any of the features thereof. The inclusion of a further sealing arrangement between the second port and the valve member may further improve the sealing of the valve member and thus further prevent fluid from escaping around the valve member. In the example above in which the first port is acting as the inlet port, when the valve member is in the open position, the further sealing arrangement helps to ensure that fluid cannot escape around the valve member when the valve member is open, and the fluid pressure in the valve assembly is high. Additionally, the further sealing arrangement may allow the first and second ports to interchangeably be used as input and output ports whilst still providing a high quality seal.

As described above, the sealing arrangement may prevent the leaking of fluid around the valve member. In the case where the valve member is in the closed position, this may help to prevent the unwanted flow of fluid between the first and second ports. In some examples, the valve assembly comprises at least one further port and at least one further fluid passageway connecting the further port to another port. With the valve member in an appropriate position, the at least one further port may be connected to at least one of the first or second ports. The valve assembly may comprise a plurality of further ports. Accordingly, in such examples, the sealing arrangement may act to prevent unwanted flow of fluid between the ports when they are not fluidly connected via the valve member. Depending on the particular fluids being controlled by the valve, the sealing and prevention of unwanted flow around the valve member may be particularly important. The at least one further port, or indeed any number of the plurality of further ports, may each comprise a sealing arrangement having the configuration described above.

The sealing member may be made from any material which can provide a suitable seal around the valve member. For example, the sealing member may be made from high stiffness rubber, or another suitable elastomer. The sealing member may be made from polyoxymethylene (POM), polyamide (PA) or any suitable plastic composite, for example a plastic composite including bronze or graphite powder. In some examples, however, the sealing member is made from polytetrafluoroethylene (PTFE). The use of PTFE is advantageous as it has a low coefficient of friction which allows the valve member to be moved between the open and closed positions more easily.

The valve assembly may be used in any application where control over fluid flow is required. It may be particularly suitable in applications where the fluid pressure is expected to be high. For example, the valve assembly may be used in aeronautical applications, e.g. in the control of water distribution within an aircraft. The valve assembly may, for example, also be used to control the flow of fuel within an aircraft, or to control the flow of hydraulic fluid to various actuation mechanisms.

The valve assembly may be used to control the flow of any suitable fluid, for example: water, oil, fuel, gas etc. The fluid may, for example, be a liquid, a gas, or any combination thereof.

BRIEF DESCRIPTION OF THE DRAWINGS

Certain examples of the present disclosure will now be described with reference to the accompanying drawings, in which.

DETAILED DESCRIPTION

Figure 1:
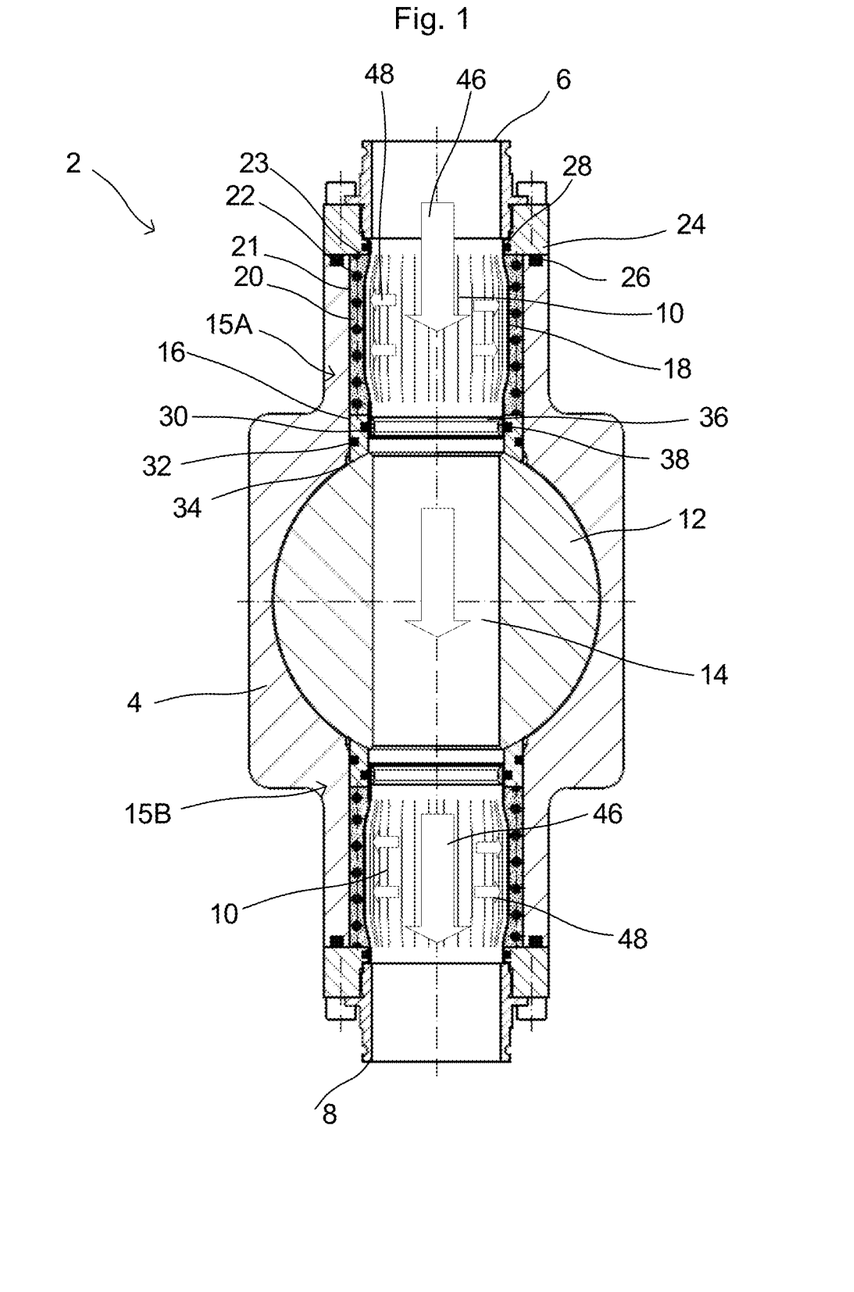
FIG. 1 is a sectional view of a valve assembly in accordance with an example of the present disclosure.

FIG. 1 is a sectional view of a valve assembly 2 in accordance with an example of the present disclosure. The valve assembly 2 comprises a valve body 4 comprising a first port 6, a second port 8 and a fluid passageway 10 extending between the first and second ports 6, 8. A valve member 12 is arranged in the fluid passageway 10. The valve member 12 comprises a through port 14 extending through the body of the valve member 12. In the example shown, the valve member 12 is in the form of a rotatable ball valve member. The valve assembly 2 may thus be considered to be a ball valve. However, any other suitable valve member 12 may be used. The valve member 12 is moveable, in this example rotatable, between an open position (as shown in FIG. 1) in which fluid can flow between the first and second ports 6, 8 and a closed position (shown in FIG. 6), in which fluid cannot flow between the first and second ports 6, 8.

Which of the first and second ports 6, 8 is considered to be an input port or an output port, depends on the direction of fluid flow through the valve assembly 2. For example, if fluid enters the valve assembly 2 via the first port 6, the first port 6 may be considered to be an inlet port, and the second port 8 may be considered to be an outlet port. Conversely, if fluid enters the valve assembly via the second port 8, the second port 8 may be considered to be an inlet port, and the first port 6 may be considered to be an outlet port.

The valve assembly 2 further comprises a sealing arrangement 15A which acts to seal the fluid passageway 10 around the valve member 12. The sealing arrangement 15A prevents fluid, which is in the fluid passageway 10, escaping around an outer surface of the valve member 12. The sealing arrangement 15A comprises a sealing member 16 arranged to seal against an outer surface the valve member 16 such that fluid cannot flow around an outer surface of the valve member. The shape of the sealing member 16 may depend on the shape 12 of the through port 14 in the valve member 12 and the shape of the fluid passageway 10. The through port 12 and fluid passageway 10 may have a circular cross section and thus the sealing member 16 may have a complimentary ring shape such that the sealing member 16 can extend around the through port 12 as depicted in FIG. 1. The sealing member 16 may be made from any suitable material that can provide a sufficient seal, for example polytetrafluoroethylene (PTFE).

The sealing arrangement 15A also comprises a sleeve 18 arranged in the fluid passageway 10. The sleeve 18 is a hollow cylinder which permits the flow fluid therethrough. The sleeve 18 therefore partially defines the fluid passageway 10 through the valve assembly 2. The sleeve 18 is arranged between the first port 6 and the valve member 12. In the example shown, the sleeve 18 comprises a corrugated structure. This is shown more clearly in FIGS. 4 and 5.

Figure 4:
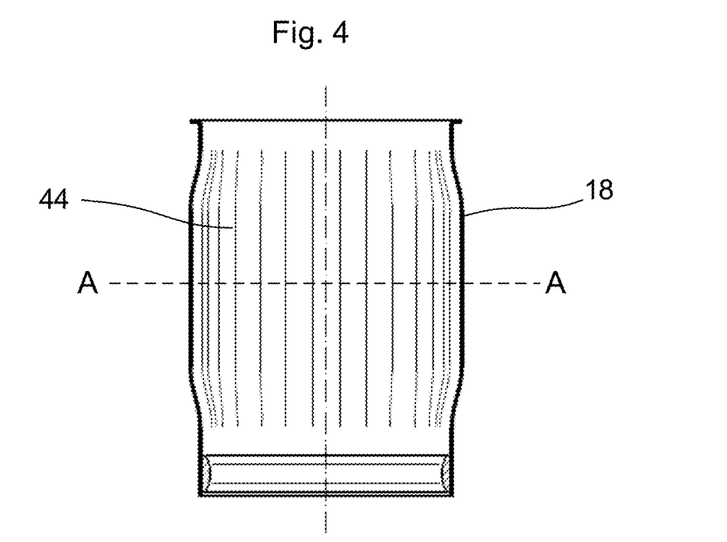
FIG. 4 is a side view of the sleeve in isolation.
Figure 5:
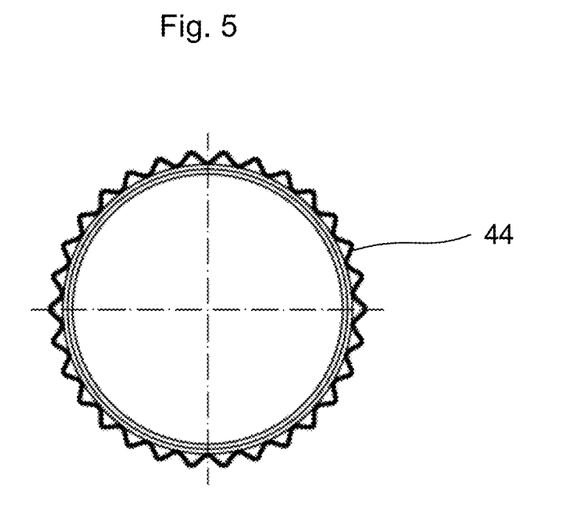
FIG. 5 is a sectional view through the line A-A in the sleeve shown in FIG. 4.

FIG. 4 shows a view of the sleeve 18 in isolation and FIG. 5 shows an cross-sectional view through the line A-A shown in FIG. 4. With reference to FIGS. 4 and 5, the sleeve 18 is in the form of a hollow cylinder and has an outer profile formed of a plurality of corrugations 44. As will be described in more detail below, the corrugations allow the sleeve 18 to expand more easily under the influence of fluid pressure within the sleeve 18. Any number of corrugations 44 may be provided, and the particular shape of the corrugations 44 may be chosen so as to control how the sleeve 18 deforms/expands under fluid pressure.

Referring back to FIG. 1, a deformable, incompressible medium 20 is arranged around the sleeve 10. The medium 20 is contained within a cavity 21 which is at least partially defined by the sleeve 18 and the valve body 4. A lowermost portion of the cavity 21 is defined by the sealing member 16 which closes one end of the cavity 21. The uppermost end of the cavity 21 is defined by a fixed wall 23. In the example shown, the fixed wall 23 is provided by a fixing element 24, which will be described in more detail below with respect to FIG. 2. The sealing member 16 may be considered to translate, at least to a small degree, within the cavity 21 so as to be forced into contact with the valve member 12. In the example shown, the sealing member 16 is restricted such that it can move along the direction towards the valve member 12.

The medium 20 may be any suitable material which is deformable and incompressible such that it efficiently transfers the force imparted upon it by the expanding sleeve 18. The medium 20 may, for example, comprise grease or oil.

A resilient member 22, in the form of a coiled spring, is also arranged in the cavity 21, and is arranged to resiliently bias the sealing member 16 into contact with the valve member 12. The resilient member 22 abuts against the fixed wall 23 at one end and against the sealing member 16 at the other end 16. When the valve assembly 2 is assembled, the resilient member 22 may be configured such that it applies a resilient bias to the sealing member 16 when no fluid is in, or passing through, the valve assembly 2. This advantageously ensures that a high quality seal is formed around the valve member 16 even when the low fluid pressure in the valve assembly 2 is low, i.e. when the fluid pressure is too low to cause deformation of the sleeve 18.

Figure 2:
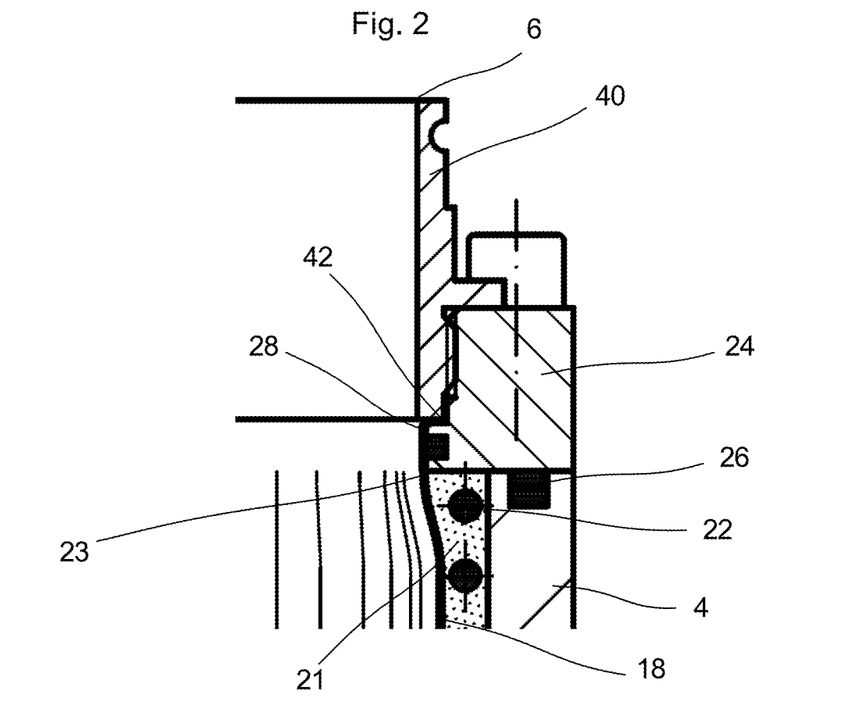
FIG. 2 is a sectional view focusing on the first port of the valve assembly shown in FIG. 1.

With reference to FIG. 1 and FIG. 2, which shows the upper end of the valve assembly in more detail, the upper end of the cavity 21 is closed by the fixed wall 23 of the fixing element 24. A first fixing element seal 26 is arranged between the fixing element 24 and the valve body 4 so as to prevent the outflow of the medium 20 from the cavity 21. A second fixing element seal 28 is arranged between the sleeve 18 and the fixing element 24. This acts to prevent the outflow of the medium 20 into the fluid passageway 10 and also prevent the flow of fluid within the fluid passageway 10 into the cavity 21. The first fixing element seal 26 and the second fixing element seal 28 may be in the form of O-ring seals.

In the example shown, the fixing element 24 also functions to secure the sleeve 18 to the valve body 4. A lip 42 of the sleeve 18 is sandwiched between the fixing element 24 and a port member 40 which defines the input port 6. Whilst not visible, the fixing element 24 comprises a threaded portion and the port member 40 comprises a corresponding threaded portion which engage with one another to hold port member 40 in engagement with the fixing element 24. The fixing element 24 is held to the valve body 4 via screws (not shown).

Figure 3:
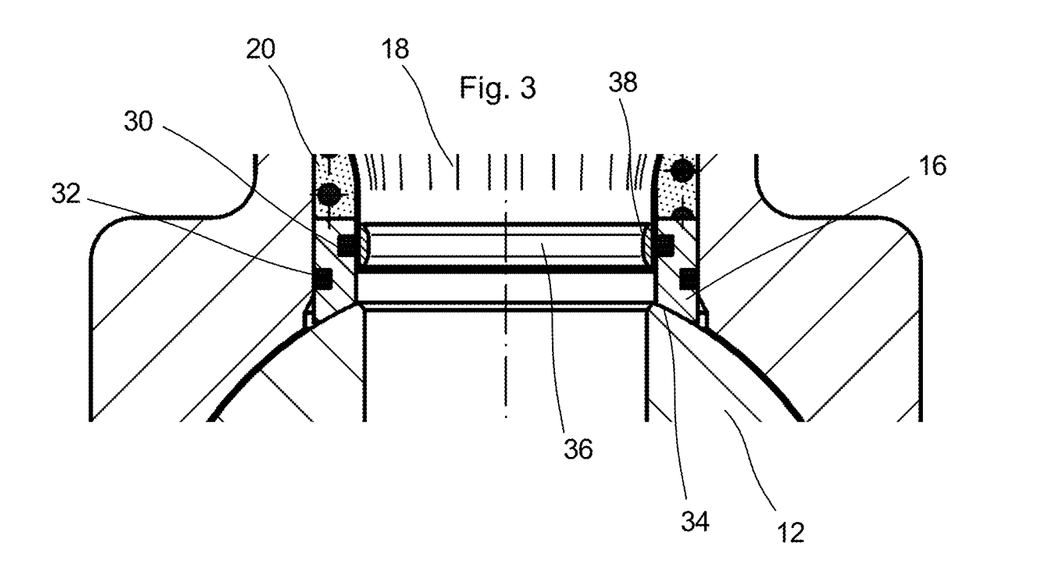
FIG. 3 is a sectional view focusing on the engagement of the sealing arrangement with the valve member shown in FIG. 1.

FIG. 3 shows the sealing member 16 in contact with the valve member 12 in more detail. With reference to both FIGS. 1 and 3, a first sealing element 30 is arranged between the sealing member 16 and the sleeve 18 to prevent the outflow of the medium 20 into the fluid passageway and also prevent the flow of fluid in the fluid passageway 10 into the cavity 21 wherein the medium 20 is contained. A second sealing element 32 is arranged between the sealing member 16 and the valve body 4. This prevents the outflow of the medium 20 out of the cavity and around an outer surface 34 of the valve member 12. The first sealing element 30 and second sealing element 32 may all be in the form of O-ring seals.

In the example depicted, the sealing member 16 extends around a portion 36 of the sleeve 18. A portion 36 of the sleeve 18 adjacent the sealing member 16 is configured such that it does not deform under fluid pressure in the sleeve 18. In the example depicted, this is achieved through the presence of a stiffening band 38 provided around the sleeve 18 in the portion 36 adjacent the sealing member 16 such that said portion 36 cannot deform. The stiffening band 38 may be formed of a material which is stiffer, i.e. more resistant to deformation, than the rest of the sleeve 18. The stiffening band 38 may also be integrally provided with the sleeve 18. For example, the stiffening band 38 may be formed by folding of the sleeve in the portion 36.

It will be appreciated that whilst both the medium 20 and resilient member 22 are shown as acting directly on the sealing member 16, an intermediate member may be provided between the sealing member 16 and the medium and resilient member 22. Any suitable intermediate member may be used.

Referring back to FIG. 1, the valve assembly 2 comprises a further sealing arrangement 15B which is arranged between the second port 8 and the valve member 12. The further sealing arrangement 15B is identical to the sealing arrangement 15A discussed above and functions in an identical manner.

As mentioned above, FIG. 6 shows a sectional view of the valve assembly 2 shown in FIG. 1, with the valve member 12 in the closed position as shown. In the closed position, the through port 14 of the valve member 12 is no longer aligned with the fluid passageway 10 and thus fluid can no longer flow between the first port 6 and second port 8. When the valve member 12 is in the closed position, the sealing arrangements 15A, 15B, seal around the valve member 12 and such that fluid cannot escape around the valve member 12.

Operation of the valve assembly 2 will now be described with reference to FIGS. 1 to 6. Sealing within the valve assembly 2 will be described in detail with respect to sealing arrangement 15A, but it should be understood that the same applies to the further sealing arrangement 15B. With the valve member 12 in the open position, as shown in FIG. 1, fluid can freely flow between the first and second ports 6, 8. In the example shown in FIG. 1, for illustrative purposes, the first port 6 is functions as an inlet port and the second port 8 is functioning as an outlet port. The arrows 46 show the direction of fluid flow through the fluid passageway 10 from the first port 6 to the second port 8, via the through port 14 of the valve member 12.

The fluid in the fluid passageway 10 may be under pressure and thus apply an outward force, illustrated by arrows 48, on the sleeve 18. When the pressure is sufficiently high, the outwards pressure 48 will cause the sleeve member 18 to deform, i.e. expand, into the cavity 21. With reference to FIGS. 4 and 5, this deformation may be facilitated by the corrugations 44 which allow the sleeve member 18 to expand. Deformation of the sleeve 18 is intended to refer to a change in shape of the sleeve 18 which results in a change of the shape of the cavity 21 which contains the medium 20.

As the sleeve 18 deforms, the shape of the cavity 21 changes and the medium 20 forces the valve member 16 against the outer surface 34 of the valve member 20 to accommodate the expansion of the sleeve 18. In other words, the medium 20 transfers the outward force provided by the deformed sleeve 18 into a force acting on the sealing member 16. The fixed wall 23 provides a fixed reference point and so as the sleeve 18 expands the sealing member 16 will be pressed with more force against the valve member 12. This force may cause the sealing member 16 to move, at least by a small amount, towards the valve member 12. In addition, or alternatively, the force may cause the sealing member 16 to be compressed slightly and the sealing member 16 may not noticeably move within the cavity 21. The increased force provided by the medium 20 acting on the sealing member 16, in addition to the resilient bias provided by the resilient member 22, will therefore increase the integrity of the seal. Accordingly, the fluid pressure within the valve assembly 2 is actively used to increase the quality of the seal provided by the sealing member 16 so as to ensure that fluid cannot escape around the valve member 12.

The stiffening band 38 serves to prevent the lower portion 36 of the sleeve 8 from deforming. This helps to prevent the lower portion 36 of the sleeve, which is adjacent to the sealing member 16, from acting on the sealing member 16 in a direction which does not act to improve the sealing provided by the sealing member 16. Accordingly, the stiffening band 38 helps to ensure the integrity of the seal provided by the sealing member 16.

The second sealing arrangement 15B will function in an identical manner to that described above for the sealing arrangement 15A. Accordingly, the pressure of the fluid passing through the valve assembly 2 may be utilised to active improve the quality of the seal around the valve member 12 between the valve member 12 and each of the first and second ports 6, 8.

Figure 6:
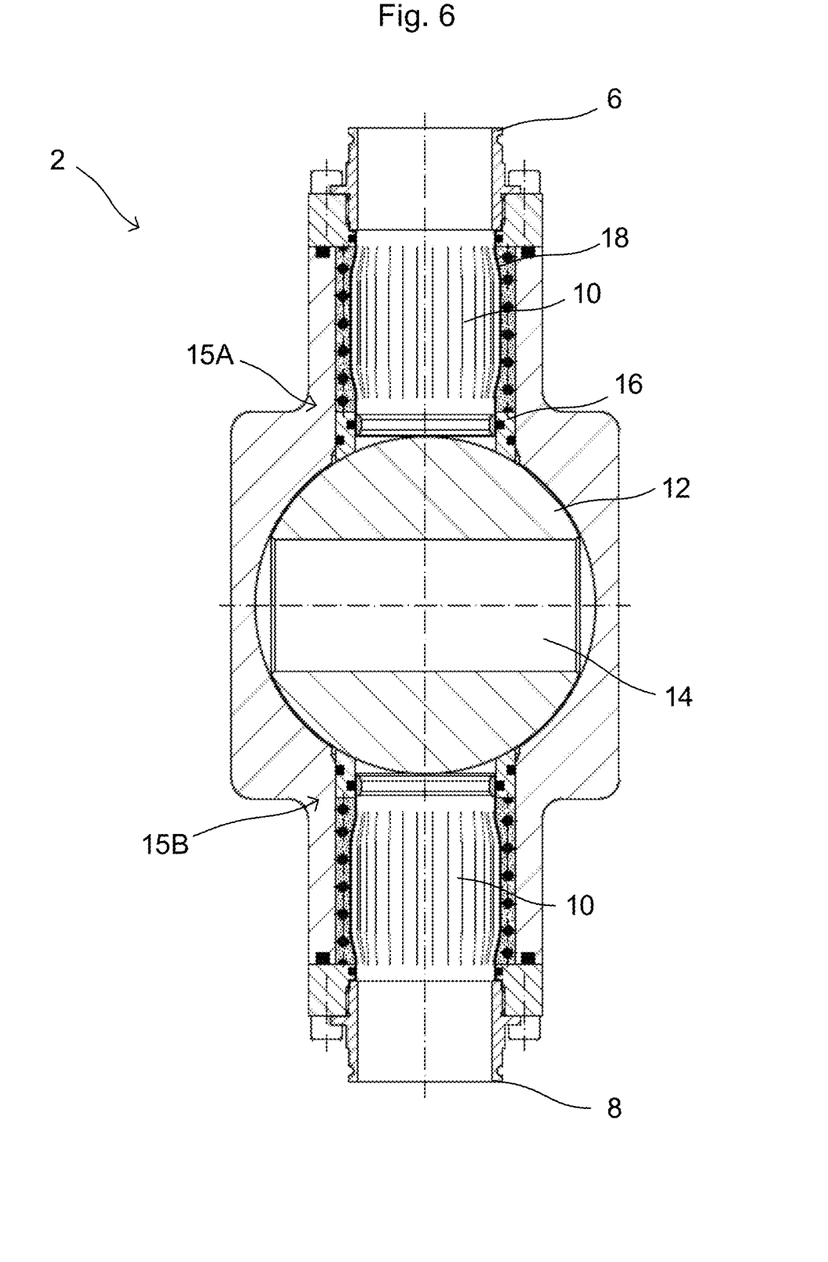
FIG. 6 is a sectional view of the valve assembly shown in FIG. 1, with the valve member in a closed position.

With reference to FIG. 6, when the valve member 12 is in the closed position, and taking the first port 6 as in the inlet port, fluid may still be within valve assembly 2 in the portion of the fluid passageway 10 between the first port 6 and the valve member 12. The fluid pressure applied to the sleeve 18 by the fluid in the fluid passageway 10 will cause the sealing member 16 to be pressed against the valve member 12 with an increased force in the same manner as described above. Accordingly, the sealing arrangements 15A, 15B will serve to prevent the leaking of fluid around the valve member 12 when the valve member 12 is in the closed position as well as when it is in the open position.

The valve member 12 may be moved between the open and closed positions described above using any suitable means. For example, a handle may be connected to the valve member 12. In another example, the valve member 12 may be driven between the open and closed positions by a motor.

Figure 7:
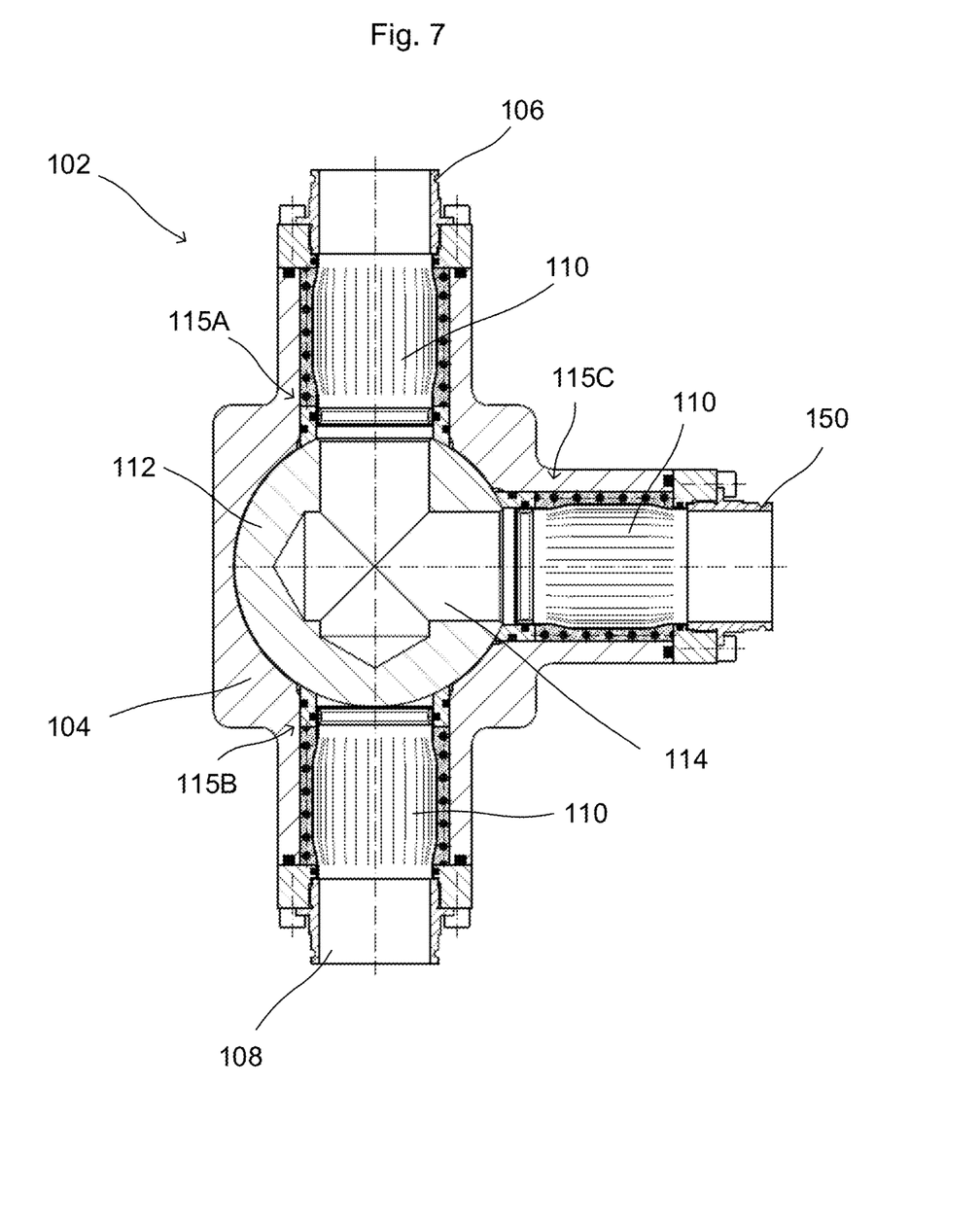
FIG. 7 is a sectional view of a valve assembly which comprises three ports in accordance with another example of the present disclosure.

FIG. 7 shows a sectional view of a valve assembly 102 in accordance with another example of the present disclosure. The valve assembly 102 comprises a valve body 104 comprising a first port 106, a second port 108 and a further port in the form of a third port 150. The first port 106 and second port 108 are arranged in line with one another, and the third port 150 is orthogonal to both the first and second ports 106, 108. A valve member 112 is provided at an intersection of the fluid passageway 110 extending from each port 106, 108, 150. The valve member 112 comprises a right-angled through port 114. The valve member 112 may be a ball valve member.

The valve member 112 may be rotated between a first open position in which the first port 106 and third port 150 are connected, a second open position in which the second port 108 and third port 150 are connected, and a closed position in which none of the ports 106, 108, 150 are connected. A first sealing arrangement 115A is arranged between the first port 106 and valve member 112, a second sealing arrangement 115B is arranged between the second port 108 and valve member 112, and a third sealing arrangement 115C is arranged between the third port 150 and the valve member 112. Each of the sealing arrangements 115A, 115B, 115C, may function in an identical manner to the sealing arrangement 15A described above with respect to FIGS. 1-6.

In a similar manner to the first example described above, the sealing arrangements 115A, 115B, 115C act to prevent the unwanted leakage of fluid around the valve member 112 during use of the valve assembly 112. Without the presence of the sealing arrangements 115A, 115B, 115C, fluid may more easily leak around the valve member 112 and escape the valve assembly 102 out through a port 106, 108, 150, which is not connected by the valve member 112. Depending on the particular application of the valve assembly 102, such leakage could be dangerous and thus the sealing arrangements 115A, 115B, 115C help to reduce this risk.

Figure 8:
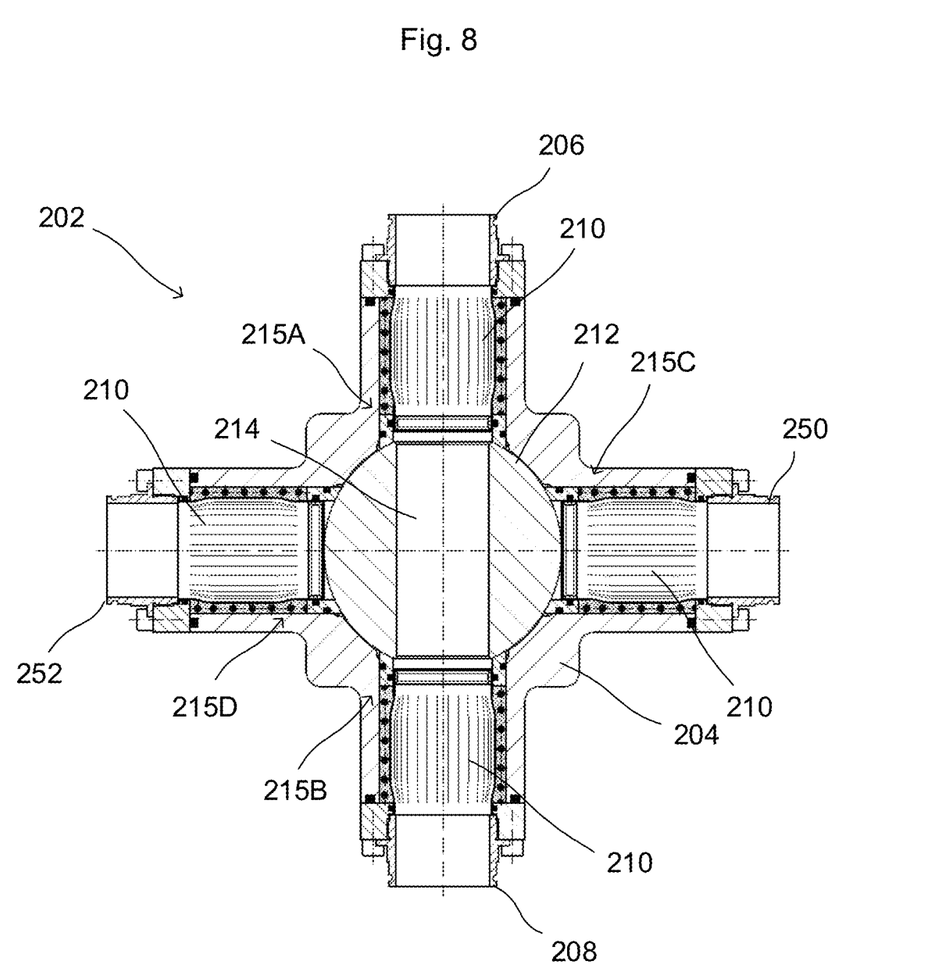
FIG. 8 is a sectional view of a valve assembly which comprises four ports in accordance with a further example of the present disclosure.

FIG. 8 shows a sectional view of a valve assembly 202 in accordance with a further example of the present disclosure. The valve assembly 202 comprises a valve body 204 which comprises four ports: a first port 106, a second port 208, a third port 250 and a fourth port 252. A valve member 212 is arranged at the intersection of the fluid passageway 210 extending between each of the ports 206, 208, 250, 252. The valve member 212 comprises a straight, through port 214 and therefore the valve member 212 can be positioned, e.g. through rotation, to connect two opposite ports 206, 208, 250, 252. As with the previous examples, the valve member 212 may be a ball valve member.

A first sealing arrangement 215A is arranged between the first port 206 and valve member 212. A second sealing arrangement 215B is arranged between the second port 208 and valve member 212. A third sealing arrangement 215C is arranged between the third port 250 and the valve member 212. A fourth sealing arrangement 215D is arranged between the fourth port 252 and the valve member 212. The first, second, third and fourth sealing arrangements 215A, 215B, 215C, 215D may all be identical to the sealing arrangement 15A shown in FIG. 1 and may function in an identical manner. The sealing arrangements 215A, 215B, 215C, 215D may each act to prevent the leakage of fluid around the valve member 212 which may result in fluid leaking out through a port 206, 208, 250, 252 which is not connected for fluid flow.

Figure 9:
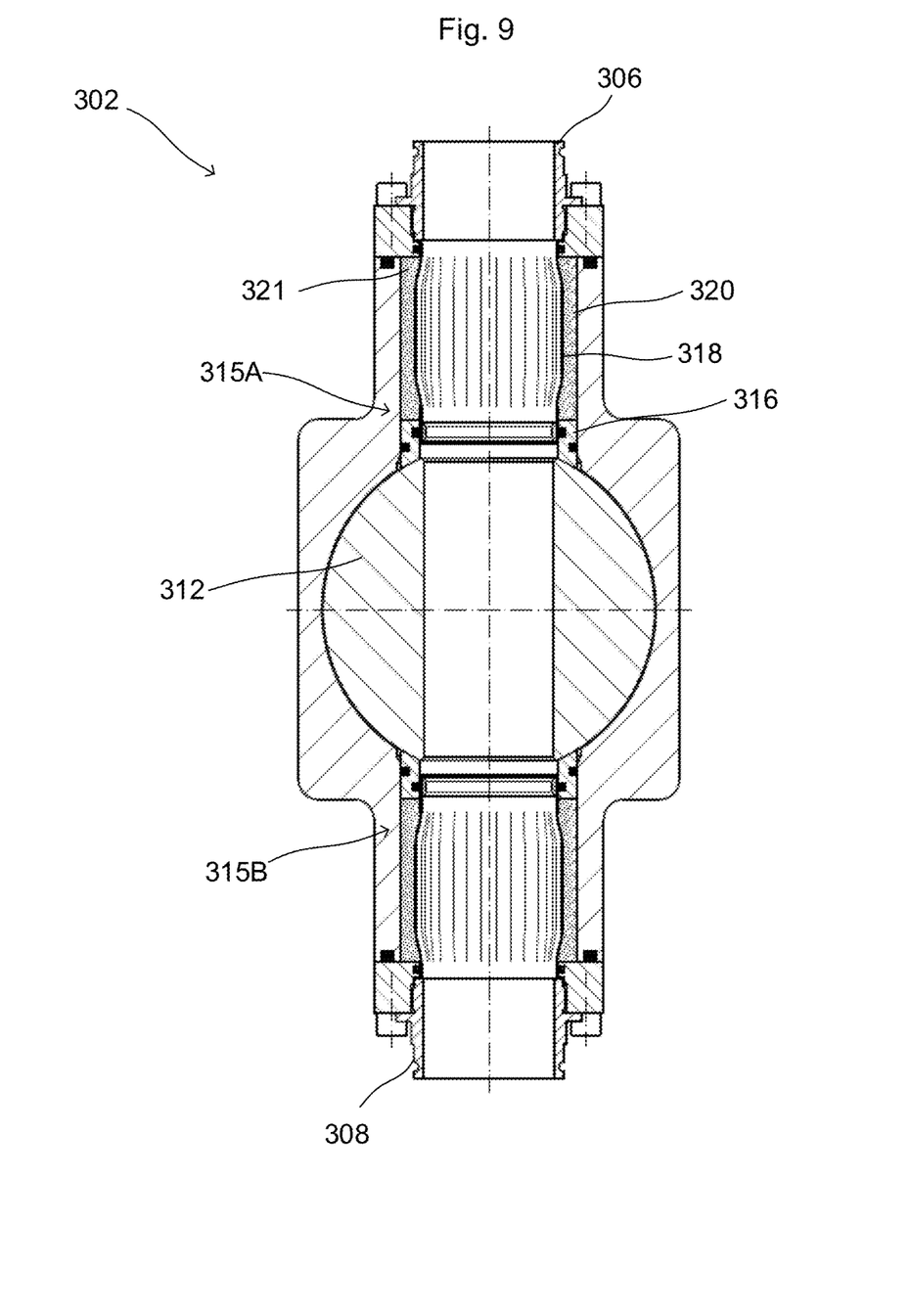
FIG. 9 is a sectional view of a valve assembly which does not comprise a resilient member in accordance with a further example of the present disclosure.

FIG. 9 shows a sectional view of a valve assembly 302 in accordance with a further example the present disclosure. The valve assembly 302 is identical to the valve assembly 2 shown in FIG. 1, except that each of the sealing arrangements 315A, 315B does not include a resilient member which biases the sealing member 316. Instead, the sealing arrangement 315A relies upon a force applied by the medium 320 to the sealing member 316 to achieve a suitable seal around the valve member 312. The medium 320 may be inserted into the cavity 321 under pressure such that even when there is minimal, or no, pressure applied to the sleeve 318 from fluid within the sleeve 318, the sealing member 316 may nonetheless be held against the valve member 316 under the pressure exerted by the medium 320. It may, therefore, be possible to avoid the need for a resilient member. This may reduce the cost of the valve assembly 302 and simplify its manufacture. The pressure which the medium 320 is inserted into the cavity 321 may depend on the application of the valve assembly 302, for example it may depend on the type of fluid which passes through the valve assembly 302. The pressure may also depend on the expected pressures of fluid in the valve assembly 2 in use.

The sealing arrangements 315A, 315B illustrated in FIG. 9 function in an identical manner to the sealing arrangements 15A, 15B described above with respect to FIGS. 1-6, except that there is no resilient member which applies an additional biasing force to the sealing member 316. As the sleeve 318 is deformed, this forces the medium 320 against the sealing member 316 to further improve the quality of the seal provided.

The second, i.e. further, sealing arrangement 315B arranged between the second port 308 and the valve member 312 may be identical to the first valve arrangement, as is depicted. Alternatively, however, the second sealing arrangement may have the same arrangement as the sealing arrangement 15A shown in FIG. 1. In other words, one of the sealing arrangements may comprise a resilient member, and one of them may not. This may depend on the particular configuration of the valve assembly 302 and, for example, which of the first and second ports 306, 308 is acting as the inlet port and which is acting as the outlet port.

It will be appreciated by those skilled in the art that examples of the present disclosure provide an improved valve assembly. While specific examples of the disclosure have been described in detail, it will be appreciated by those skilled in the art that the examples described in detail are not limiting on the scope of the disclosure.

The invention claimed is:

1. A valve assembly comprising:
   a valve body comprising a first port, a second port and a fluid passageway extending between the first and second ports;
   a valve member, comprising a through port, arranged in the fluid passageway and moveable between an open position in which a fluid can flow between the first and second ports through the through port, and a closed position in which the fluid cannot flow between the first and second ports; and
   a sealing arrangement, arranged between the first port and the valve member, comprising:
      a sealing member arranged to seal against the valve member such that the fluid cannot flow around an outer surface of the valve member;
      a sleeve arranged in the fluid passageway between the first port and the valve member; and
      a deformable, incompressible, medium contained around the sleeve and arranged such that, in use, the fluid within the sleeve exerts an outward pressure on the sleeve causing the sleeve to deform and act on the medium which applies a force to push the sealing member against the valve member.

2. The valve assembly as claimed in claim 1, wherein the valve member comprises a rotatable ball valve member.

3. A valve assembly as claimed in claim 2, further comprising a resilient member arranged to resiliently bias the sealing member into contact with the valve member.

4. A valve assembly as claimed in claim 1, further comprising a resilient member arranged to resiliently bias the sealing member into contact with the valve member.

5. A valve assembly as claimed in claim 1, wherein the sealing member extends around a portion of the sleeve, and wherein said portion of the sleeve adjacent the sealing member is configured such that it does not deform under fluid pressure in the sleeve.

6. A valve assembly as claimed in claim 5, wherein a stiffening band is arranged around the portion of the sleeve adjacent the sealing member such that said portion cannot deform.

7. A valve assembly as claimed in claim 1, comprising a first sealing element arranged between the sealing member and the sleeve.

8. A valve assembly as claimed in claim 7, comprising a second sealing element arranged between the sealing member and the valve body.

9. A valve assembly as claimed in claim 1, comprising a second sealing element arranged between the sealing member and the valve body.

10. A valve assembly as claimed in claim 1, wherein the medium is inserted into the valve assembly under pressure.

11. A valve assembly as claimed in claim 1, wherein the sleeve comprises a corrugated structure.

12. A valve assembly as claimed in claim 1, wherein the medium is contained within a cavity, defined by the valve body, around the sleeve.

13. A valve assembly as claimed in claim 12, wherein the sealing member defines a first end of the cavity, and a second end of the cavity is defined by a fixed wall.

14. A valve assembly as claimed in claim 1, wherein the medium is grease.

15. A valve assembly as claimed in claim 1, wherein the medium is oil.

16. A valve assembly as claimed in claim 1, comprising a further sealing arrangement arranged between the second port and the valve member, the further sealing arrangement comprising:
   a further sealing member arranged to seal against the valve member such that the fluid cannot flow around the outer surface of the valve member;
   a further sleeve arranged in the fluid passageway between the second port and the valve member; and
   a further deformable, incompressible, medium contained around the further sleeve and arranged such that, in use, the fluid within the further sleeve exerts an outward pressure on the further sleeve causing the further sleeve to deform and act on the further medium which applies a force to push the further sealing member against the valve member.

17. A valve assembly as claimed in claim 1, comprising at least one further port and at least one further fluid passageway connecting the further port to another port.

18. A valve assembly as claimed in claim 1, wherein the sealing member is made from polytetrafluoroethylene.

\* \* \* \* \*